United States Patent
Kim

(10) Patent No.: US 12,284,412 B2
(45) Date of Patent: **\*Apr. 22, 2025**

(54) METHOD OF CONTROLLING DISPLAY MODULE AND ELECTRONIC DEVICE PERFORMING THE METHOD

(71) Applicant: SAMSUNG ELECTRONICS CO., LTD., Suwon-si (KR)

(72) Inventor: Yangsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,413

(22) Filed: Apr. 24, 2024

(65) Prior Publication Data

US 2024/0283999 A1    Aug. 22, 2024

Related U.S. Application Data

(63) Continuation of application No. 18/194,902, filed on Apr. 3, 2023, now Pat. No. 12,081,824, which is a
(Continued)

(30) Foreign Application Priority Data

Jan. 6, 2022  (KR) .................. 10-2022-0002148

(51) Int. Cl.
*H04N 21/43* (2011.01)
*H04N 21/431* (2011.01)
*H04N 21/44* (2011.01)

(52) U.S. Cl.
CPC ... *H04N 21/4316* (2013.01); *H04N 21/44008* (2013.01)

(58) Field of Classification Search
CPC .................. H04N 21/4316; H04N 21/44008
See application file for complete search history.

(56) References Cited

U.S. PATENT DOCUMENTS

| 2006/0181645 A1 | 8/2006 | Sarika |
| 2007/0014541 A1 | 1/2007 | Im |
| 2008/0170058 A1* | 7/2008 | Ahn ........................ H04N 7/141 |
| | | 348/E7.078 |

(Continued)

FOREIGN PATENT DOCUMENTS

| JP | 4475019 | 3/2010 |
| JP | 6853154 | 3/2021 |

(Continued)

OTHER PUBLICATIONS

U.S. Appl. No. 18/194,902, filed Apr. 3, 2023, Kim.
(Continued)

*Primary Examiner* — David E Choi
(74) *Attorney, Agent, or Firm* — NIXON & VANDERHYE P.C.

(57) ABSTRACT

A method of controlling a display module and an electronic device for performing the method are disclosed. The electronic device may include: at least one processor including processing circuitry, a display module, a memory electrically connected to the at least one processor and configured to store instructions and an application executable by the at least one processor. The at least one processor is configured, when the instructions are executed to: identify video data on a size, a state, and a position of a video object executed by the application, and based on an input not being received in a specified input waiting time, control a screen output on the display module based on the video data.

16 Claims, 11 Drawing Sheets

Related U.S. Application Data continuation of application No. PCT/KR2023/000114, filed on Jan. 4, 2023.

(56) References Cited

U.S. PATENT DOCUMENTS

| | | | |
|---|---|---|---|
| 2009/0217212 | A1 | 8/2009 | Madar et al. |
| 2010/0313172 | A1* | 12/2010 | Hirahara ................ H04N 21/47 715/867 |
| 2011/0154270 | A1* | 6/2011 | Sonoda .............. H04N 21/4384 715/867 |
| 2016/0364246 | A1 | 12/2016 | Lee et al. |
| 2018/0221762 | A1* | 8/2018 | Noguchi ................ A63F 13/352 |
| 2023/0247249 | A1* | 8/2023 | Kim ................ H04N 21/41407 715/867 |

FOREIGN PATENT DOCUMENTS

| | | |
|---|---|---|
| KR | 10-2011-0060505 | 6/2011 |
| KR | 10-2011-0121173 | 11/2011 |
| KR | 20160107738 | 9/2016 |
| KR | 102238549 | 4/2021 |

OTHER PUBLICATIONS

Office Action dated Aug. 29, 2023 for U.S. Appl. No. 18/194,902, 21 pages.

Search Report dated Apr. 4, 2023 issued in International Patent Application No. PCT/KR2023/000114.

Extended European Search Report for EP Application No. 23737358.4 dated Nov. 25, 2024, 7 pages.

* cited by examiner

METHOD OF CONTROLLING DISPLAY MODULE AND ELECTRONIC DEVICE PERFORMING THE METHOD

CROSS-REFERENCE TO RELATED APPLICATIONS

This application is a continuation of U.S. application Ser. No. 18/194,902, filed on Apr. 3, 2023, which is a continuation application of International Application No. PCT/KR2023/000114 designating the United States, filed on Jan. 4, 2023, in the Korean Intellectual Property Receiving Office and claiming priority to Korean Patent Application No. 10-2022-0002148, filed on Jan. 6, 2022, in the Korean Intellectual Property Office, the disclosures of which are incorporated by reference herein in their entireties.

BACKGROUND

1. Field

The disclosure relates to a method of controlling a display module and an electronic device performing the method.

2. Description of Related Art

When the same screen is exposed for a long period, burn-in that leaves an afterimage on a display may occur on various displays, such as a television (TV) and a monitor.

More particularly, an organic light-emitting diode (OLED) product is significantly vulnerable to burn-in, and thus, there is an effort to alleviate the occurrence of burn-in through various methods of preventing burn-in.

Burn-in may be prevented/reduced by a method of outputting a screensaver on the entire screen when there is no user input for a long time.

In case of an application configured with a graphical user interface (UI), burn-in may be prevented/reduced by outputting a screensaver on the full screen. When a video is played on the full screen, it is determined that the user intends to view the video, and thus, the screensaver may not be output.

When a graphical UI is integrated with video content, considering user convenience, a measure for preventing burn-in appropriate for an intention of a user may be needed. For example, in case of an application or content in which a graphical UI is integrated with video content, outputting a protective screen of a screensaver or providing a special form (e.g., a blackening process) on a graphical UI portion may suspend the user from experiencing content or may provide an awkward user experience.

SUMMARY

Embodiments of the disclosure provide, when a graphical UI is integrated with video content or video content is output on a partial area of a display module, a method of controlling a display module and an electronic device may be provided to output the video content on a full area of the display module or output a protective screen of a screensaver, based on an intention of a user.

According to various example embodiments, considering an intention of a user, a method of controlling a display module and an electronic device for preventing/reducing burn-in of a display while maximally/increasingly maintaining user experience of an application or content may be provided.

According to various example embodiments, an electronic device may include: a processor, a display module including a display panel, a memory electrically connected to the processor and storing instructions and an application executable by the processor, wherein the processor is configured to, when the instructions are executed: identify video data on a size, a state, and a position of a video object executed by the application, and based on an input not being received in a specified input waiting time, control a screen output on the display module, based on the video data.

According to various example embodiments, a method of controlling a display module is provided, the method may include: identifying video data on a size, a state, and a position of a video object executed by an application, and based on an input not being received in a specified input waiting time, controlling a screen output on a display module, based on the video data.

According to various example embodiments, a method of controlling a display module is provided, the method may include: identifying video data on a size, a state, and a position of a video object from an application configured to execute the video object, controlling an operation of a screensaver configured to output a protective screen on a display module, based on the video data, and based on an input not being received in a specified input waiting time, controlling a screen output on the display module, based on at least one of the video data or the operation of the screensaver.

According to various example embodiments, burn-in of a display product that is vulnerable to burn-in may be prevented and/or reduced while maximally/improving maintaining user experience of content or an application using a method of controlling a display module and an electronic device performing the method.

According to various example embodiments, video content that is output on a partial area of a display module may be output on a full area of the display module or a protective screen of a screensaver may be output, and burn-in of the display may be prevented and/or reduced using a method of controlling a display module and an electronic device performing the method.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
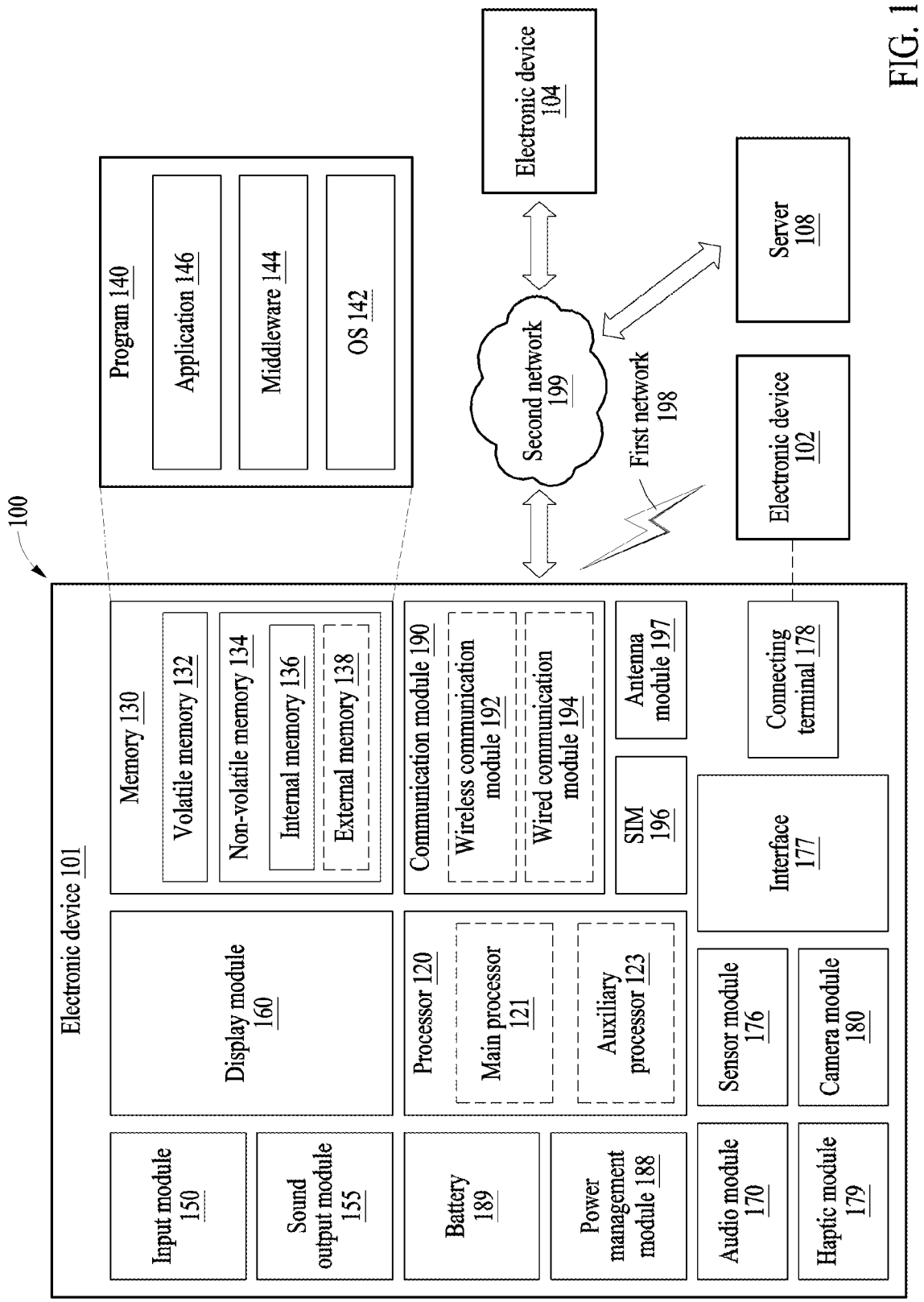
FIG. 1 is a block diagram illustrating an example electronic device in a network environment, according to various embodiments.

Hereinafter, various example embodiments will be described in greater detail with reference to the accompanying drawings. When describing the various example embodiments with reference to the accompanying drawings, like reference numerals refer to like elements and a repeated description related thereto may not be provided.

FIG. 1 is a block diagram illustrating an example electronic device 101 in a network environment 100, according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added in the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
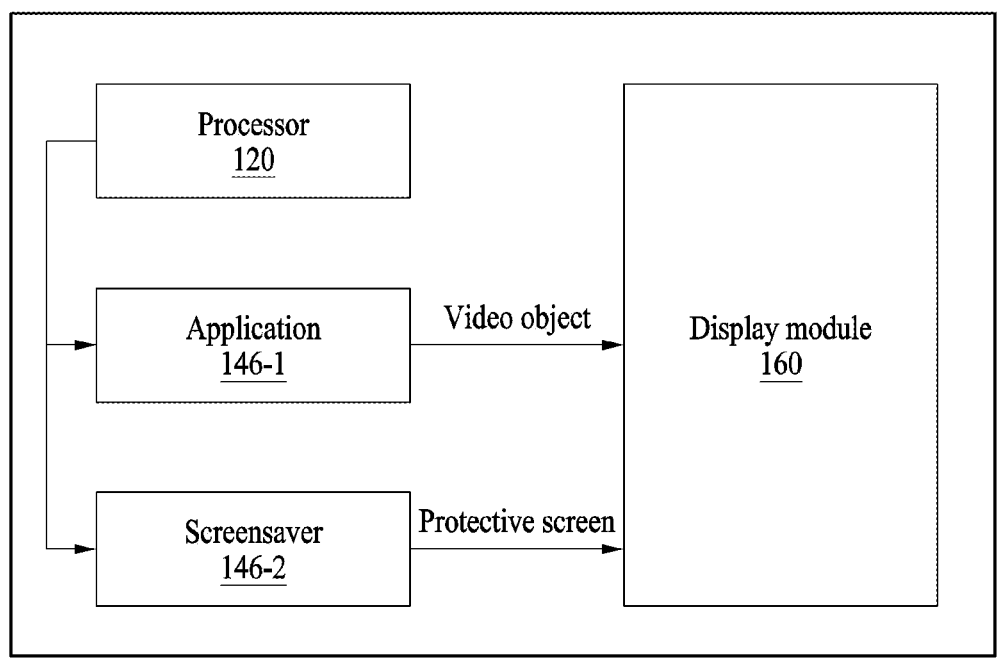
FIG. 2 is a block diagram illustrating an example operation of an electronic device according to various embodiments.

FIG. 2 is a block diagram illustrating an operation of an electronic device (e.g., the electronic device 101 of FIG. 1) according to various embodiments.

Referring to FIG. 2, the electronic device 101 according to an embodiment may include a processor (e.g., including various processing circuitry, e.g., the processor 120 of FIG. 1), an application 146-1 (e.g., the application 146 of FIG. 1), a screensaver 146-2 (e.g., the application 146 of FIG. 1), and a display module (e.g., the display module 160 of FIG. 1 including e.g., a display panel).

The electronic device 101 may execute the application 146-1 or the screensaver 146-2 and may control an operation of the application 146-1 or an operation of the screensaver 146-2. For example, a program may include the application 146-1 or the screensaver 146-2 and a program may be stored in a memory.

In an embodiment, the application 146-1 may output a graphical user interface (UI) or a video object on the display module 160. The display module 160 may visually provide the graphical UI or the video object to the outside (e.g., a user).

In an embodiment, the graphical UI may represent information that is visually expressed on the display module 160 to mutually interact with the electronic device 101. For example, the display module 160 may include a touch sensor adapted to detect a touch, or a pressure sensor adapted to measure the intensity of force incurred by the touch. The application 146-1 may visually provide the graphical UI using the display module 160 and may output the graphical UI on the display module 160, based on a touch input by the user.

In an embodiment, the video object may be a moving image visually expressed on the display module 160. For example, the application 146-1 may include a video player (not shown) configured to play the video object. The application 146-1 may control an operation of the video object using the video player. For example, the application 146-1 may control an operation of the video object, such as playing, stop, moving a time step, and adjusting a volume level of the video object.

In an embodiment, the processor 120 may include various processing circuitry and identify video data on the size, state, and position of the video object. The processor 120 may identify the video data from the application 146-1. For example, the application 146-1 may execute the video object and the processor 120 may identify the video data from the application 146-1.

The processor 120 may identify the size of the video object provided by the display module 160. For example, the size of the video object may be the horizontal length and the vertical length of the video object that is output on the display module 160. The processor 120 may identify a state of the video object as a playback state or a stopped state based on whether the video object is playing.

The position of the video object may be coordinates of the video object. Based on the position of the video object, all or a portion of the video object may be output on the display module 160. In an embodiment, based on the position of the video object, the video object may not be output on the display module 160 while the video object is executed. The video object in the stopped state or the playback state may not be output on the display module 160 and only the graphical UI may be output on the display module 160.

For example, when the application 146-1 is a web browser, the electronic device 101 may output a graphical UI of the web browser and/or the video object on the screen from the display module 160. The electronic device 101 may identify the size, state, and position of the video object in a web page including the video object.

In an embodiment, the screensaver 146-2 may output a protective screen on the display module 160. When the electronic device 101 does not receive an input from the user for a set time for protecting the display, reducing power consumption, etc., the screensaver 146-2 may output the protective screen on the display module 160. For example, the protective screen may be a black screen or a continuously moving image.

In an embodiment, when the electronic device 101 does not receive an input for a set (e.g., specified) input waiting time (or period), the electronic device 101 may control a screen output on the display module 160, based on the video data. For example, the electronic device 101 may determine whether an input is received in the set input waiting time. For example, the processor 120 may determine whether an input module (e.g., the input module 150 of FIG. 1) or the display module 160 receives an input from a user. When an input is received from the user in the input waiting time, the electronic device 101 may initialize the input waiting time.

In an embodiment, when the electronic device 101 does not receive an input for the input waiting time, the electronic device 101 may control a screen output on the display module 160, based on the video data.

For example, when a video object in the playback state is output on a partial area of the display module 160 and an input is not received in the input waiting time, the electronic device 101 may output the video object on the full area of the display module 160. An operation of the electronic device 101 to output the video object on the full area of the display module 160 is described in greater detail below with reference to FIGS. 4, 5A and 5B.

In an embodiment, when the video object in the stopped state is output on the partial area or the full area of the display module 160 and the processor 120 does not receive an input to play the video object in the input waiting time, the electronic device 101 may activate a screensaver such that a protective screen output by the screensaver 146-2 is output on the full area of the display module 160.

For example, when the video object is not output on the display module 160 and an input is not received in the input waiting time, the electronic device 101 may execute the screensaver 146-2 and may output the protective screen on the display module 160. An operation of the electronic device 101 to output the protective screen on the display module 160 is described in greater detail below with reference to FIGS. 4, 5A, 5B, 6A, 6B and 6C.

In an embodiment, the electronic device 101 may identify a graphical UI output on the display module 160. For example, the processor 120 may identify the graphical UI output from the application 146-1 on the display module 160. The application 146-1 may process content that changes in real-time. The application 146-1 may output the content that changes in real-time through the graphical UI. Of the graphical UI output by the application 146-1, the processor 120 may identify the graphical UI that changes in real-time, based on the content included in the graphical UI.

For example, the electronic device 101 may access, using the application 146-1, a chatroom in which users participate through a plurality of external electronic devices 101. The electronic device 101 may receive a chat message from a server and may transmit, to the server, a chat message that is input through the application 146-1. The application 146-1 may output the graphical UI for displaying a chat message on a chat window to the display module 160. The graphical UI for displaying the chat message on the chat window may change in real-time, based on a chat message received from the server and/or a chat message input to the electronic device 101. The processor 120 may identify the graphical UI including the chat window through the graphical UI that changes in real-time.

In an embodiment, the electronic device 101 may control a screen output on the display module 160, based on the graphical UI. For example, the electronic device 101 may determine whether the graphical UI is the graphical UI that changes in real-time and may control the screen output on the display module 160.

For example, when the video object that is playing is output on the partial area of the display module 160, the graphical UI that changes in real-time is output on the display module 160, and an input is not received in the input waiting time, the electronic device 101 may continuously output the video object that is playing and the graphical UI that changes in real-time, which are currently output on the display module 160, and may perform a screen protection process by decreasing the brightness of an area other than the video object that is playing and the graphical UI that changes in real-time.

In an embodiment, when the video object is not output on the display module 160, the graphical UI that changes in real-time is output on the display module 160, and an input is not received in the input waiting time, the electronic device 101 may continuously output the graphical UI that is currently output on the display module 160 and may perform the screen protection process by decreasing the brightness of an area other than the graphical UI while continuously outputting the graphical UI.

In an embodiment, the electronic device 101 may set, in advance, the graphical UI that changes in real-time, based on the content included in the graphical UI. For example, the graphical UI may include content, such as a chat window configured to transmit/receive a chat message, an information window of the video object, and an access path of an image related to the video object. The electronic device 101 may set the graphical UI including the chat window to the graphical UI that changes in real-time. When the graphical UI including the chat window is output on the display module 160, the processor 120 may identify that the graphical UI that changes in real-time is output on the display module 160.

An operation of the electronic device 101 to output the video object and/or the graphical UI on the display module 160 is described in greater detail below with reference to FIG. 8.

Figure 3:
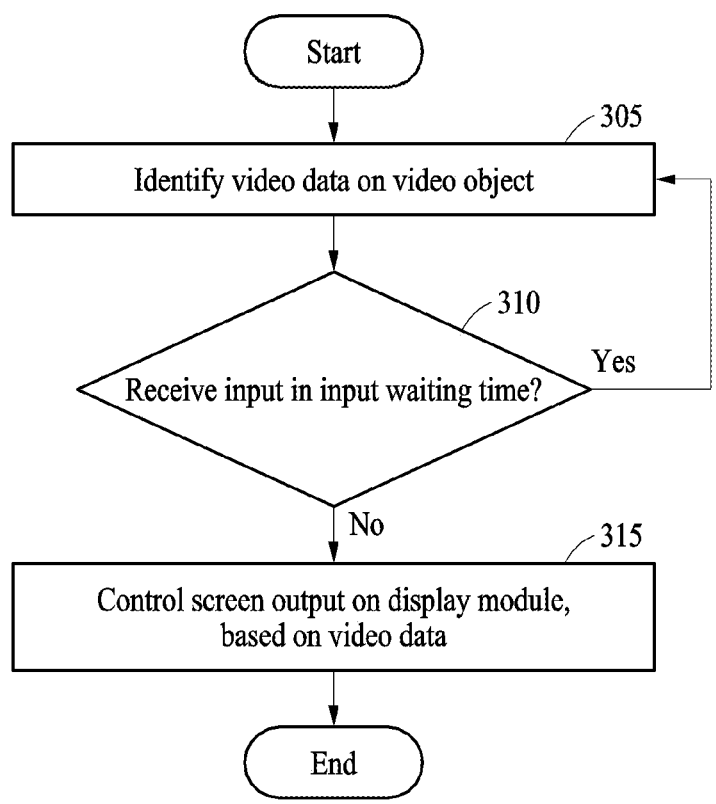
FIG. 3 is a flowchart illustrating an example operation of an electronic device to control a display module according to various embodiments.

FIG. 3 is a flowchart illustrating an example operation of an electronic device (e.g., the electronic device 101 of FIG. 1) to control a display module (e.g., the display module 160 of FIG. 1) according to various embodiments.

Referring to FIG. 3, in operation 305, the electronic device 101 according to an embodiment may identify video data on a video object. For example, the electronic device 101 may identify the video data from an application (e.g., the application 146-1 of FIG. 2) configured to execute a video object. The video data may include information on the size, state, and position of the video object.

In an embodiment, in operation 310, the electronic device 101 may determine whether an input is received in an input waiting time. For example, the electronic device 101 may determine whether an input module (e.g., the input module 150 of FIG. 1) or the display module 160 receives an input from a user. In operation 310, when the electronic device 101 receives an input in the input waiting time, the electronic device 101 may initialize the input waiting time and may identify the video data, based on operation 305.

In an embodiment, when the electronic device 101 does not receive an input for the input waiting time in operation 310, in operation 315, the electronic device 101 may control a screen output on the display module 160, based on the video data.

For example, the electronic device 101 may output, on the full area of the display module 160, the video object that is in the playback state and output on a partial area of the display module 160. When the video object in the stopped state is output on the full area or the partial area of the display module 160, the electronic device 101 may execute a screensaver (e.g., the screensaver 146-2 of FIG. 2) and output a protective screen on the display module 160.

Figure 4:
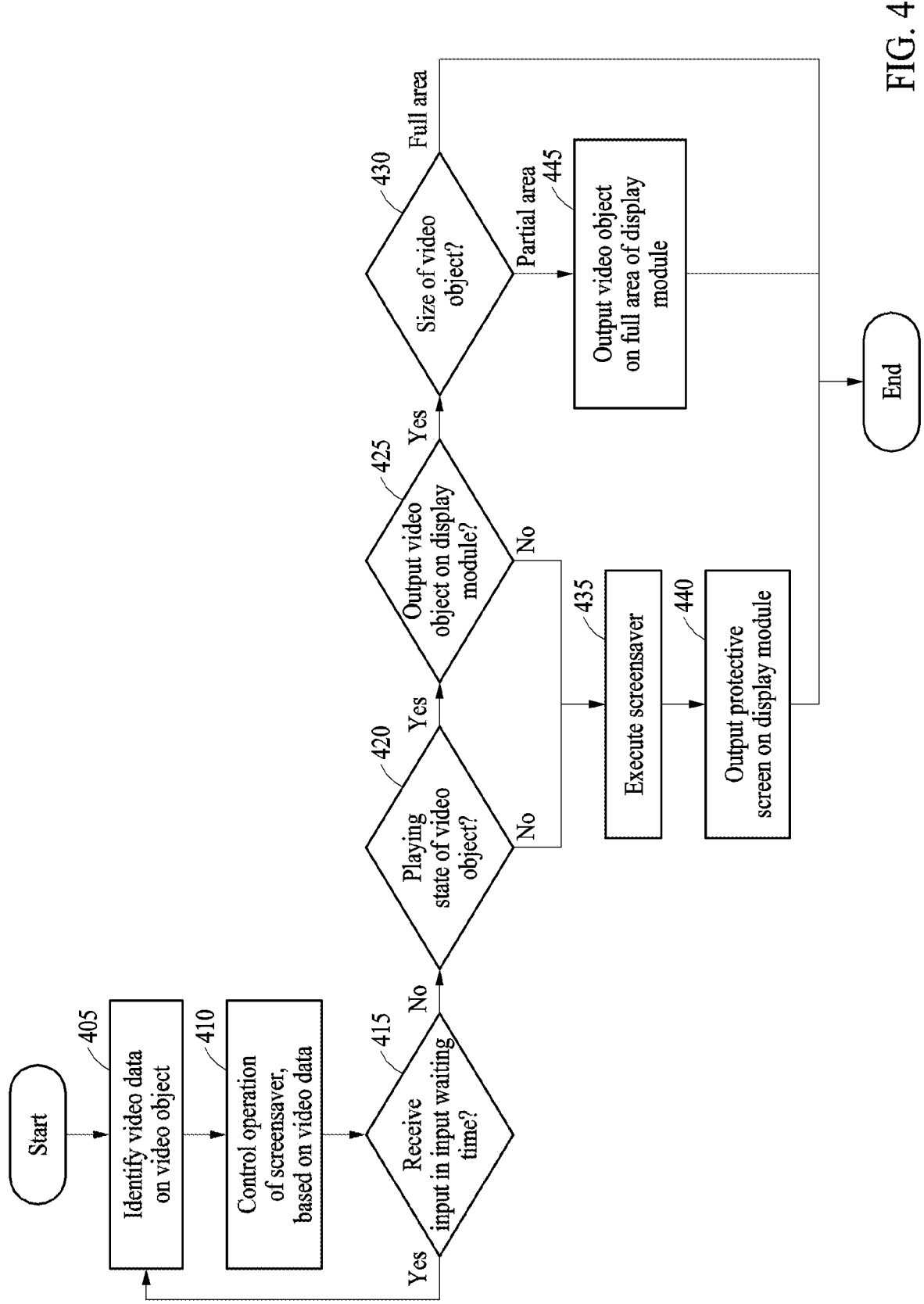
FIG. 4 is a flowchart illustrating an example operation of an electronic device to output a protective screen or a video object on a display module according to various embodiments.

FIG. 4 is a flowchart illustrating an example operation of an electronic device (e.g., the electronic device 101 of FIG. 1) to output a protective screen or a video object on a display module (e.g., the display module 160 of FIG. 1), according to various embodiments.

Referring to FIG. 4, in operation 405, the electronic device 101 according to an embodiment may identify video data on a video object. The description of operation 305 of FIG. 3 may be applied to operation 405 in substantially the same manner.

In an embodiment, in operation 410, the electronic device 101 may control an operation of a screensaver (e.g., the screensaver 146-2 of FIG. 2), based on the video data. For example, the electronic device 101 may execute the screensaver 146-2 based on an operation of a timer.

In an embodiment, the electronic device 101 may set a time on the timer. The timer may determine whether the set time has elapsed and the electronic device 101 may execute the screensaver 146-2 when the set time has elapsed. In an embodiment, the set time on the timer may be set to be the same as the input waiting time.

In an embodiment, the electronic device 101 may transmit, to the timer, an initialization signal for initializing the time counted by the timer. When the electronic device 101 transmits the initialization signal to the timer, the timer may initialize a count of elapsed time and may count the set time again. For example, when the electronic device 101 receives an input from the user, the electronic device 101 may transmit the initialization signal to the timer.

In an embodiment, the electronic device 101 may transmit the initialization signal to the timer based on the video data and may control an operation of the screensaver 146-2. For example, when the video object that is playing is output on the full area of the display module 160, the electronic device 101 may transmit the initialization signal to the timer at every set period. When the video object that is playing is output on the partial area of the display module 160, the electronic device 101 may transmit the initialization signal to the timer at every set period.

In an embodiment, the electronic device 101 may transmit the initialization signal to the timer, based on the graphical UI output on the display module 160. When the graphical UI that changes in real-time is output on the display module 160, the electronic device 101 may transmit the initialization signal to the timer at every set period.

In the example described above, when the video object that is playing is output on the full area or the partial area of the display module 160, the electronic device 101 may transmit the initialization signal to the timer at every period. The screensaver 146-2 may not be executed as the electronic device 101 periodically transmits the initialization signal to the timer.

In an embodiment, when the video object is not output on the display module 160 or the video object in the stopped state is output on the full area or the partial area of the display module 160, the electronic device 101 may not transmit the initialization signal to the timer. Since the timer does not receive the initialization signal, the timer may count the set time. When the set time on the timer has elapsed, in operations 435 and 440, the electronic device 101 may execute the screensaver 146-2 and may output the protective screen on the display module 160.

In an embodiment, in operation 415, the electronic device 101 may determine whether an input is received in an input waiting time. The description of operation 310 of FIG. 3 may be applied to operation 415 in substantially the same manner.

In an embodiment, when an input is not received in the input waiting time in operation 415, in operation 420, the electronic device 101 may determine whether the video object is in the playback state.

In an embodiment, when the video object is in the playback state, in operation 425, the electronic device 101 may determine whether the video object is output on the display module 160. For example, the electronic device 101 may determine whether the video object is output on the display module 160, based on a position of the video object.

An application (e.g., the application 146-1 of FIG. 2) may not output, on the display module 160, the video object in the playback state. For example, when the application 146-1 is a web browser, the user may scroll a web page such that the video object in the playback state may not be output on the display module 160.

In an embodiment, when the video object is in the stopped state or the video object is not output on the display module 160 in operation 420 or operation 425, the electronic device 101 may execute the screensaver 146-2 in operation 440. In operation 440, the electronic device 101 may output the protective screen on the display module 160.

When the video object is in the stopped state or the video object in the playback state is not output on the display module 160, it is difficult to determine that the user uses the electronic device 101 with an intention of viewing the video object. According to the intention of the user determined based on the video data, the electronic device 101 may output the protective screen on the display module 160. The electronic device 101 may output the protective screen on the display module 160 and may prevent and/or reduce burn-in of the display of the electronic device 101.

In an embodiment, in operation 430, the electronic device 101 may determine the size of the video object. For example, based on the size of the video object, the electronic device 101 may determine whether the video object is output on the partial area of the display module 160 or the full area of the display module 160.

In an embodiment, when the video object is output on the partial area of the display module 160 in operation 430, in operation 445, the electronic device 101 may output the video object on the full area of the display module 160.

For example, the electronic device 101 may set the video object to a full screen mode by controlling the application 146-1. The full screen mode may be a mode for outputting the video object on the full area of the display module 160.

In an embodiment, the electronic device 101 may output the video object that is playing, on the full area of the display module 160 by changing the position and/or the size of the video object. In an embodiment, based on an original ratio of the video object, the video object may be output on the display module 160 in a ratio of 16:9, 4:3, and the like. In an embodiment, based on the ratio of the video object that is output on the full area of the display module 160, the electronic device 101 may include an area in which the video object is not output, such as a black screen in the partial area of the display module 160.

When the video object that is playing is output on the partial area of the display module 160, it is determined that the user uses the electronic device 101 with an intention of viewing the video object. According to the intention of the user, determined based on the video data, the electronic device 101 may output the video object that is playing, on the full area of the display module 160. The electronic device 101 may prevent and/or reduce burn-in of the display of the electronic device 101 by outputting the video object on the full area of the display module 160.

In operation 430, when the size of the video object corresponds to the full area of the display module 160, the electronic device 101 may continuously output the video object on the full area of the display module 160.

The order of operations 420, 425, and 430, in which the electronic device 101 determines the playing state of the video object based on the video data, whether the display module 160 outputs the video object, or the size of the video object is merely an example and not limited thereto. For example, the electronic device 101 may sequentially determine the size of the video object, the playing state of the video object, and whether the display module 160 outputs the video object and may control the screen output on the display module 160.

Figure 5A:
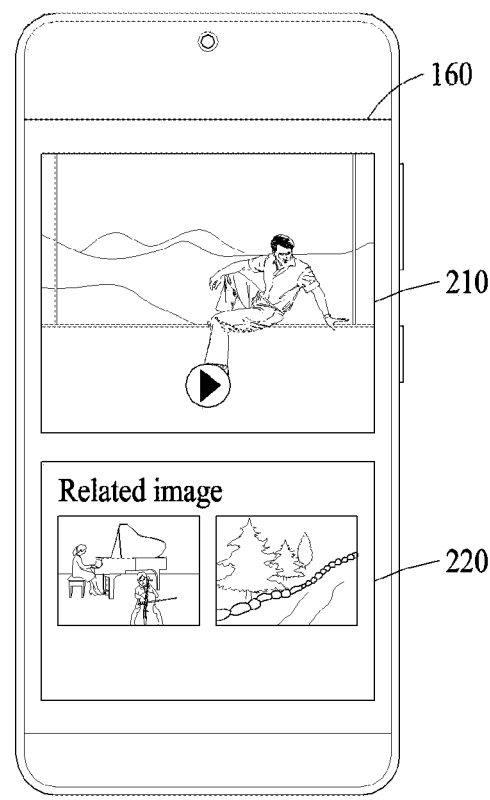
FIGS. 5A and 5B are diagrams illustrating an example operation of an electronic device to output a video object in a playback state on a full area of a display module according to various embodiments.
Figure 5B:
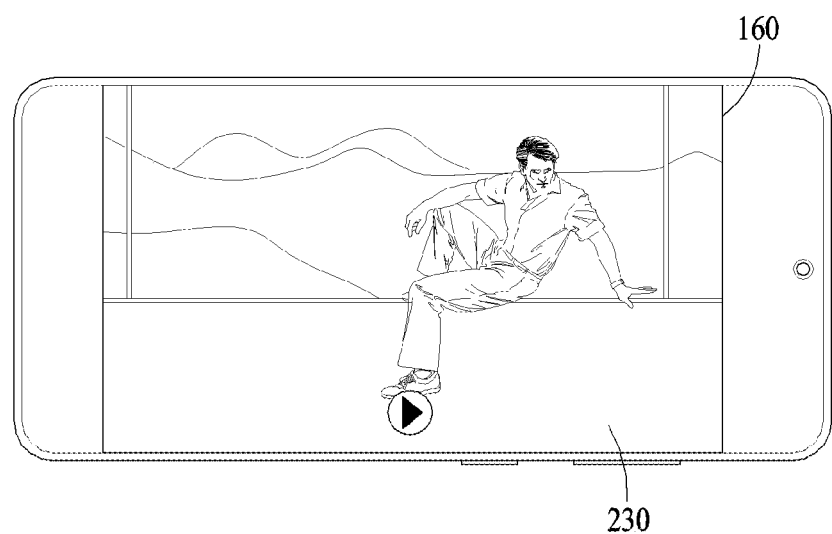

FIGS. 5A and 5B are diagrams illustrating an example operation of an electronic device (e.g., the electronic device 101 of FIG. 1) to output a video object in a playback state on the full area of the display module 160 according to various embodiments.

FIG. 5A is a diagram illustrating a video object and a graphical UI output on the display module 160 of the electronic device 101 according to an embodiment. Referring to FIG. 5A, the electronic device 101 may identify video data on the state, size, and position of the video object. The video object may be in a playback state and may be output on a partial area of the display module 160.

FIG. 5B is a diagram illustrating a video object output on the full area of the display module 160 when an input is not received in a set waiting time in FIG. 5A.

Referring to FIGS. 5A and 5B, the electronic device 101 may control a screen output on a display module (e.g., the display module 160 of FIG. 1), based on the video data. For example, when a video object 210 in the playback state is output on the partial area of the display module 160 and an input is not received in the input waiting time as shown in FIG. 5A, the electronic device 101 may output a video object 230 on the full area of the display module 160 as shown in FIG. 5B. For example, when the electronic device 101 outputs the video object on the full area of the display module 160, the electronic device 101 may control a ratio of the video object and/or an output mode (e.g., a horizontal mode and a vertical mode) of the video object.

Figure 6C:
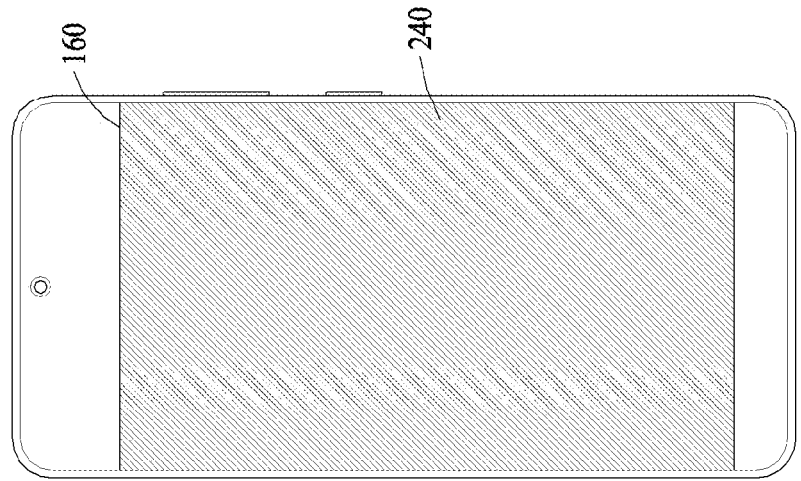
FIGS. 6A, 6B and 6C are diagrams illustrating an example operation of an electronic device to output a protective screen according to various embodiments.
Figure 6B:
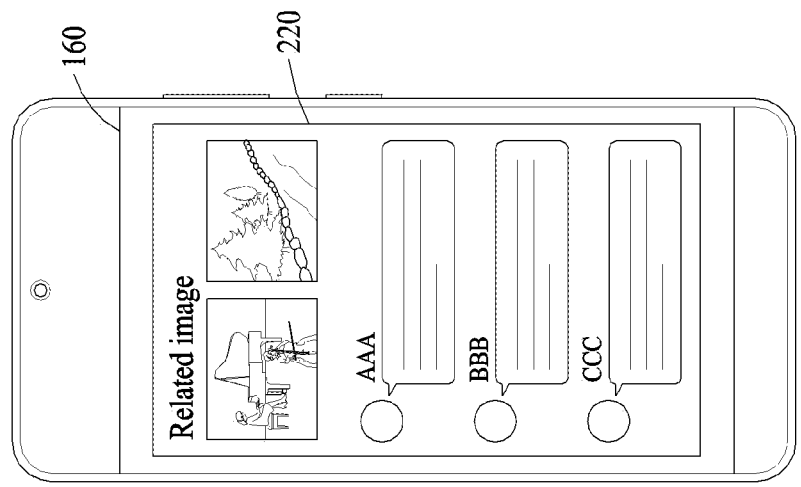
Figure 6A:
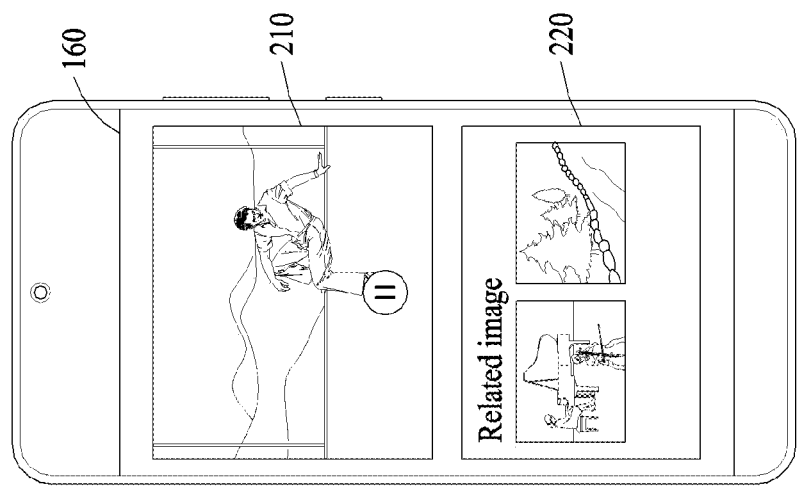

FIGS. 6A, 6B and 6C are diagrams illustrating an example operation of an electronic device (e.g., the electronic device 101 of FIG. 1) to output a protective screen according to various embodiments.

FIG. 6A illustrates the video object 210 and a graphical UI 220 (refer also to FIG. 5A) output on a display module (e.g., the display module 160 of FIG. 1), and FIG. 6B illustrates the graphical UI 220 output on the display module 160. FIG. 6C illustrates a protective screen 240 output on the display module 160.

Referring to FIG. 6A or 6B, the electronic device 101 may identify the video data and/or the graphical UI 220. For example, in FIG. 6A, the electronic device 101 may identify the video object 210 that is in the stopped state and output on the partial area of the display module 160. In FIG. 6B, the electronic device 101 may identify the graphical UI 220 including a comment window and a related image, which are output on the display module 160.

FIG. 6B illustrates the display module 160 that outputs the graphical UI 220. For example, an application (e.g., the application 146-1 of FIG. 2) may execute the graphical UI 220 and the graphical UI 220 may be output on the display module 160.

For example, the application 146-1 may execute the graphical UI 220 and the video object 210. The application 146-1 may not output the video object on the display module 160 depending on the position of the video object 210 and may output only the graphical UI on the display module 160. As illustrated in FIG. 6B, the video object 210 may not be output on the display module 160 depending on the position of the video object that is executed in the application 146-1.

Referring to FIG. 6C, the electronic device 101 may output the protective screen 240 on the display module 160. For example, the electronic device 101 may execute the screensaver 146-2 and may output the protective screen 240 on the display module 160. As illustrated in FIG. 6C, the protective screen 240 may be a black screen output on the full area of the display module 160.

In an embodiment, as illustrated in FIG. 6A, when the video object 210 in the stopped state is output on the display module 160 and an input is not received in the set input waiting time, the electronic device 101 may control the display module 160 to output the protective screen 240 as illustrated in FIG. 6C.

In an embodiment, which is different from FIGS. 6A and 6C, when the video object 210 is output on the full area of the display module 160 and an input is not received in the set input waiting time, the electronic device 101 may control the display module 160 to output the protective screen 240 as illustrated in FIG. 6C.

In an embodiment, when the graphical UI 220 is output on the display module 160 and an input is not received in the set input waiting time as illustrated in FIG. 6B, the electronic device 101 may control the display module 160 to output the protective screen 240 as illustrated in FIG. 6C.

As illustrated in FIG. 6B, when the video object 210 in the playback state or the stopped state is executed in the application 146-1 but is not output on the display module 160, the electronic device 101 may control the display module 160 to output the protective screen 240 as illustrated in FIG. 6C.

Figure 7:
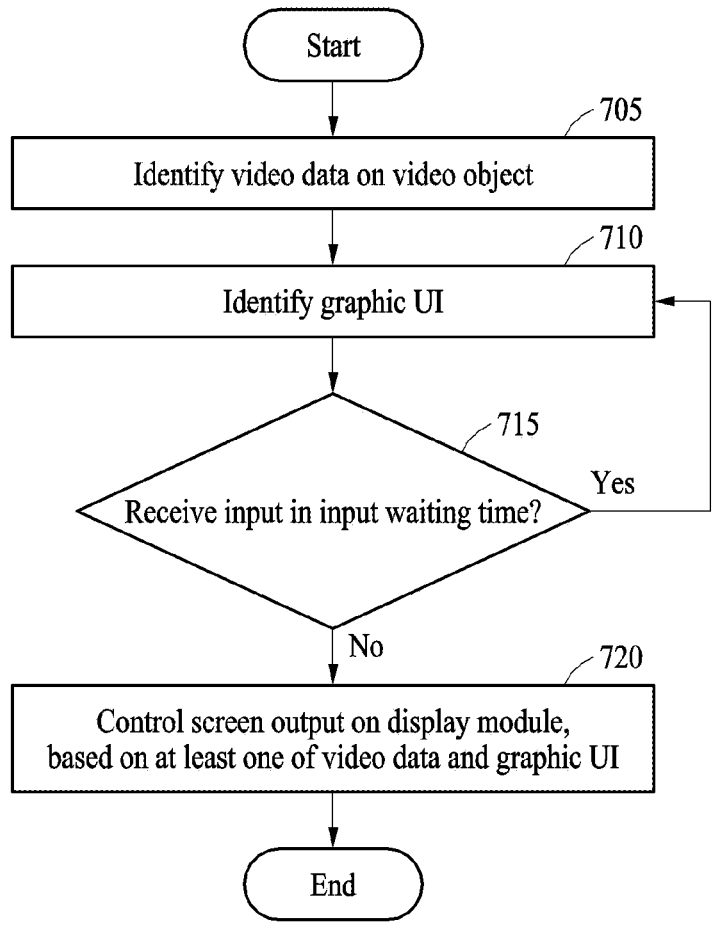
FIG. 7 is a flowchart illustrating an example operation of an electronic device to control a display module based on a graphical user interface (UI), according to various embodiments.

FIG. 7 is a flowchart illustrating an example operation of an electronic device (e.g., the electronic device 101 of FIG. 1) to control a display module (e.g., the display module 160 of FIG. 1) based on a graphical UI (e.g., the graphical UI 220 of FIG. 6A) according to various embodiments.

Referring to FIG. 7, in operation 705, the electronic device 101 may identify video data on a video object (e.g., the video object 210 of FIG. 6A). The description of operation 305 of FIG. 3 may be applied to operation 705 in substantially the same manner.

In an embodiment, in operation 710, the electronic device 101 may identify the graphical UI 220. For example, the electronic device 101 may identify the graphical UI 220 that changes in real-time.

In an embodiment, in operation 715, the electronic device 101 may determine whether an input is received in an input waiting time.

In an embodiment, in operation 720, the electronic device 101 may control a screen output on the display module 160, based on at least one of video data and the graphical UI 220 when no input is received during the waiting time in operation 715. For example, when the graphical UI 220 includes a chat window that may transmit and receive a chat message in real-time, the video object 210 that is playing is output on the partial area of the display module 160, and an input is not received in the input waiting time, the electronic device 101 may continuously output the graphical UI 220 and the video object 210 on the display module 160.

In the example described above, when the graphical UI 220 and the video object 210 are output on the display module 160, it may be determined that the user has an intention to view the graphical UI 220 and the video object 210. Based on the intention of the user, the electronic device 101 may continuously output the graphical UI 220 and the video object 210 on the display module 160.

Figure 8:
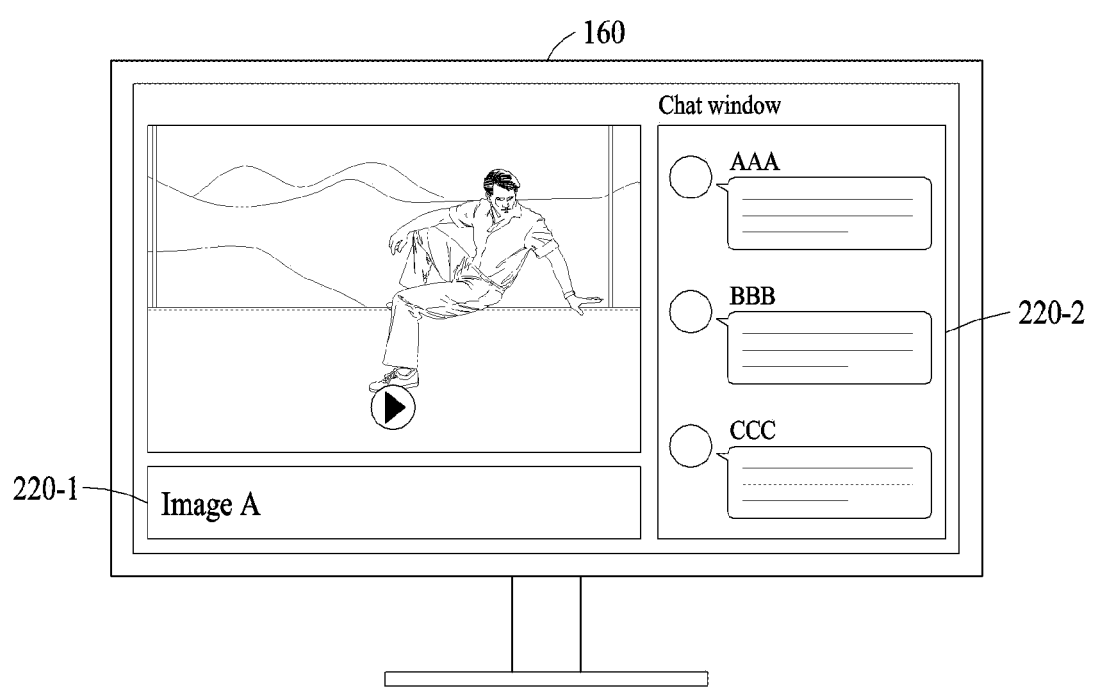
FIG. 8 is a diagram illustrating an example operation of an electronic device to control a display module configured to output a graphical UI and a video object according to various embodiments.

FIG. 8 is a diagram illustrating an example operation of an electronic device (e.g., the electronic device 101 of FIG. 1) to control a display module (e.g., the display module 160 of FIG. 1) configured to output graphical UIs 220-1 and 220-2 and the video object 210 according to various embodiments.

Referring to FIG. 8, the video object 210 and the graphical UIs 220-1 and 220-2 may be output on the display module 160. The graphical UIs 220-1 and 220-2 may include an information window configured to show information on the video object 210 and a chat window configured to transmit and receive a chat message in real-time. The graphical UI 220-2 including a chat window may be a graphical UI that changes in real-time.

In an embodiment, the electronic device 101 may identify the graphical UIs 220-1 and 220-2 and the video object 210, which are output on the display module 160 through an application (e.g., the application 146-1 of FIG. 2). For example, the processor 120 may identify an information window and a chat window executed in the application 146-1. The application 146-1 may process a chat message transmitted and received in real-time and may output a changed chat window through the graphical UI 220-2. The processor 120 may identify the graphical UI 220-2 that changes in real-time, based on processing of the chat message.

Referring to FIG. 8, when the video object 210 that is playing and the graphical UIs 220-1 and 220-2 are respectively output on partial areas of the display module 160 and an input is not received in the set input waiting time, the electronic device 101 may continuously output the video object 210 and the graphical UIs 220-1 and 220-2.

In the embodiment of FIG. 8, the electronic device 101 may determine that the user has an intention to view the video object 210 and the graphical UIs 220-1 and 220-2, based on the video data and the graphical UI 220. Based on the intention of the user, the electronic device 101 may continuously output the video object and the graphical UI and not execute the screensaver 146-2 or output the video object on the full area of the display module 160.

In comparison with the embodiment of FIG. 5 of outputting the video object on the full area of the display module 160, the electronic device 101 may continuously output the video object and the graphical UI on the display module 160 not outputting the video object that is playing on the full area of the display module 160.

In an embodiment, different from the embodiment illustrated in FIG. 8, when the video object 210 in the stopped state and the graphical UI 220 are respectively output on partial areas of the display module 160 and an input is not received in the set input waiting time, the electronic device 101 may continuously output the video object 210 and the graphical UIs 220-1 and 220-2.

In comparison with the embodiment of FIG. 6 illustrating the electronic device 101 that executes the screensaver 146-2 and outputs the protective screen on the display module 160, the electronic device 101 illustrated in FIG. 8 according to an embodiment may continuously output the video object 210 and/or the graphical UI 220 and not output a protective screen (e.g., the protective screen 240 of FIG. 6) on the display module 160.

Referring to FIG. 8, the electronic device 101 may initialize a timer by transmitting an initialization signal to the timer at a set period, based on the video data and the graphical UI 220. The electronic device 101 may periodically initialize the timer, and the screensaver (e.g., the screensaver 146-2 of FIG. 2) may not be executed.

Figure 9:
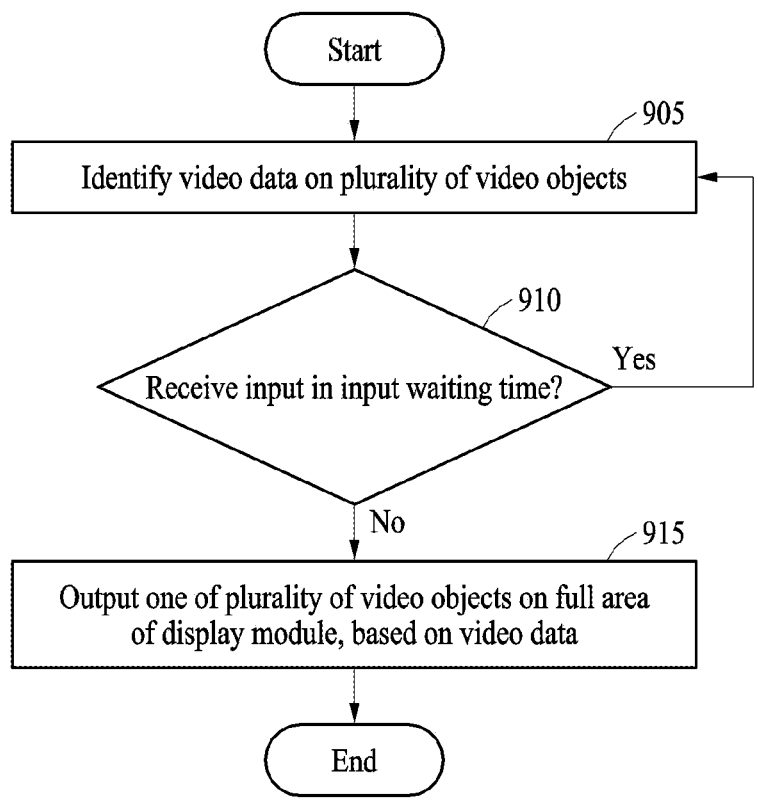
FIG. 9 is a flowchart illustrating an example operation of an electronic device to control a display module using a plurality of video objects, according to various embodiments.

FIG. 9 is a flowchart illustrating an example operation of an electronic device (e.g., the electronic device 101 of FIG. 1) to control a display module (e.g., the display module 160 of FIG. 1) using a plurality of video objects (e.g., the video object 210 of FIG. 5), according to various embodiments.

Referring to FIG. 9, in operation 905, the electronic device 101 may identify video data on a plurality of video objects 210. An application (e.g., the application 146-1 of FIG. 2) may output the plurality of video objects 210 on the display module 160 and may control an operation of the plurality of video objects 210. The video data may include the state, shape, and/or position of each of the video objects 210.

In an embodiment, in operation 910, the electronic device 101 may determine whether an input is received in an input waiting time. When the input is not received in the input waiting time in operation 910, the electronic device 101 may output one of the plurality of video objects 210 on the full area of the display module 160 based on the video data in operation 915.

In an embodiment, the electronic device 101 may control a screen output on the display module 160, based on the state of the plurality of video objects 210. For example, the electronic device 101 may output a video object 210 in the playback state among the plurality of video objects 210 on the full area of the display module 160.

In an embodiment, the electronic device 101 may control the screen output on the display module 160, based on the size of the plurality of video objects 210. For example, the electronic device 101 may output a video object 210 having the largest size among the plurality of video objects 210 on the full area of the display module 160.

In an embodiment, the electronic device 101 may control the screen output on the display module 160, based on the position of the plurality of video objects 210. For example, the electronic device 101 may output a video object 210 positioned at a set position among the plurality of video objects 210 on the full area of the display module 160.

Figure 10A:
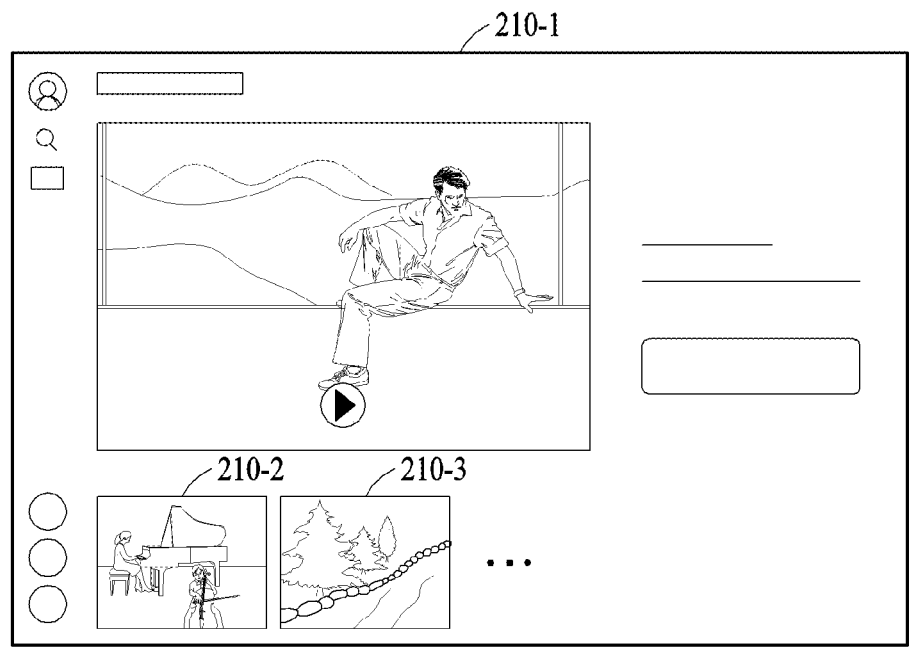
FIGS. 10A and 10B are diagrams illustrating an example operation of an electronic device to output one of video objects to a full screen of a display module according to various embodiments.
Figure 10B:
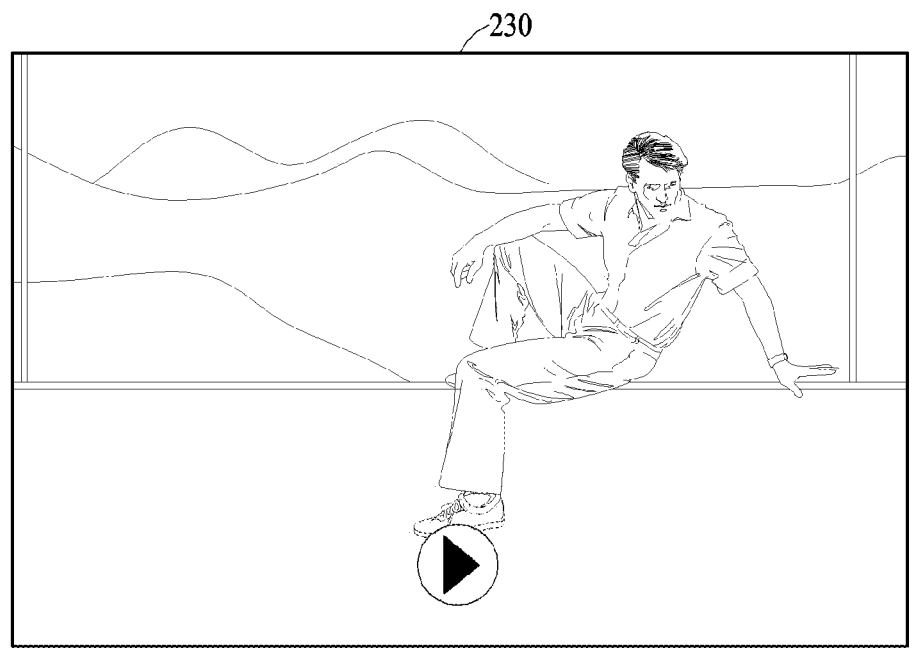

FIGS. 10A and 10B are diagrams illustrating an example operation of the electronic device 101 to output one of video objects 210-1, 210-2, and 210-3 to the full area of the display module 160 according to various embodiments.

Referring to FIGS. 10A and 10B, the electronic device 101 may output one of the plurality of video objects 210-1, 210-2, and 210-3 on the full area of the display module 160, based on video data of the plurality of video objects 210-1, 210-2, and 210-3. When the video objects 210-1, 210-2, and 210-3 are output on the display module 160 and an input is not received in an input waiting time as illustrated in FIG. 10A, the electronic device 101 may output one of the plurality of video objects 210-1, 210-2, and 210-3 on the full area of the display module 160 as illustrated in FIG. 10B.

FIG. 10B illustrates a video object 230 output on the full area of the display module 160. The electronic device 101 may output the video object 210-1 of FIG. 10A on the full area of the display module 160.

In an embodiment, the electronic device 101 may output the video object 210-1 in the playback state among the plurality of video objects 210-1, 210-2, and 210-3 of FIG. 10A on the full area of the display module 160, as illustrated in FIG. 10B.

In an embodiment, the electronic device 101 may output the video object 210-1, which has the largest size among the plurality of video objects 210-1, 210-2, and 210-3 of FIG. 10A, on the full area of the display module 160, as illustrated in FIG. 10B.

In an embodiment, the electronic device 101 may output the video object 210-1 at the set position among the plurality of video objects 210-1, 210-2, and 210-3 of FIG. 10A on the full area of the display module 160, as illustrated in FIG. 10B.

Figure 11A:
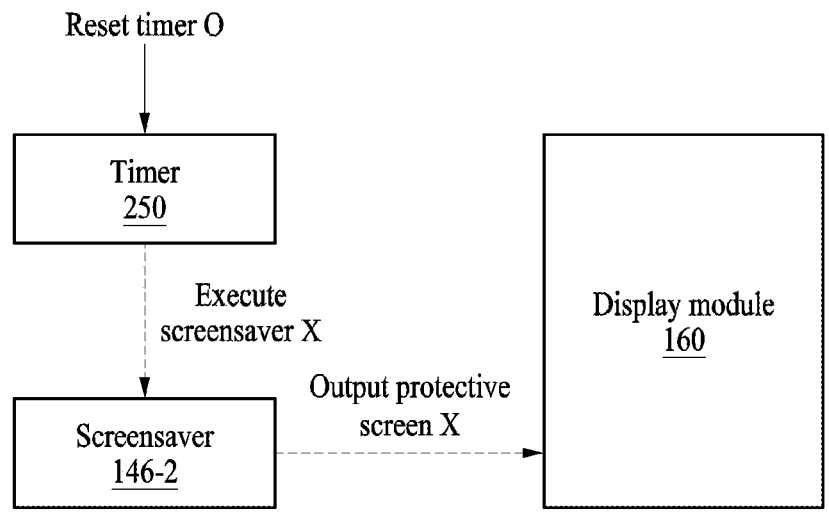
FIGS. 11A and 11B are diagrams illustrating an example operation of a timer and a screensaver according to various embodiments.
Figure 11B:
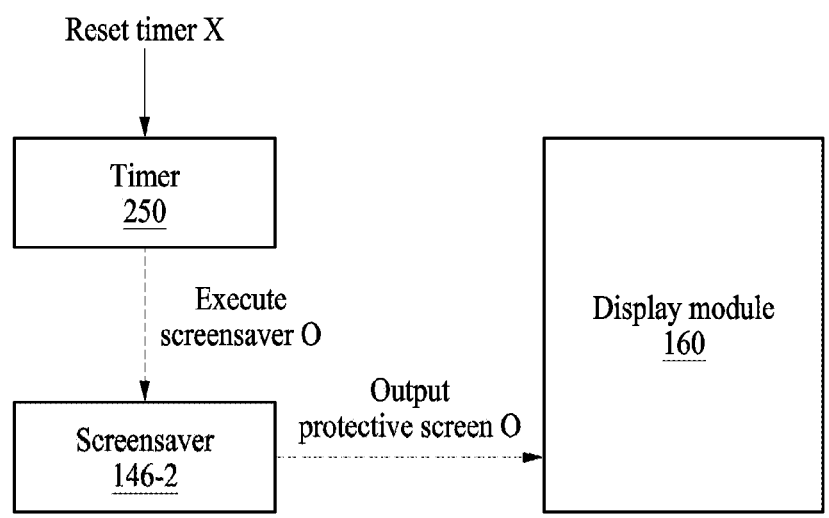

FIGS. 11A and 11B are diagrams illustrating an example operation of a timer 250 and the screensaver 146-2 according to various embodiments.

Referring to FIGS. 11A and 11B, an electronic device (e.g., the electronic device 101 of FIG. 1) may include the timer 250, the screensaver 146-2, and a display module (e.g., the display module 160 of FIG. 1). The electronic device 101 may control an operation of the screensaver 146-2, based on video data. FIG. 11A illustrates a case in which the screensaver 146-2 does not operate because the electronic device 101 initializes the timer 250, and FIG. 11B illustrates a case in which the electronic device 101 does not initialize the timer 250 and the screensaver 146-2 executes.

In an embodiment, the screensaver 146-2 may be executed by an operation of the timer 250. When the time set on the timer 250 has elapsed, the electronic device 101 may execute the screensaver 146-2. The screensaver 146-2 may output a protective screen on the display module 160.

In an embodiment, the electronic device 101 may initialize the time of the timer 250. For example, when the electronic device 101 receives an input from a user, the electronic device 101 may transmit, to the timer 250, an initialization signal for initializing the time of the timer 250. When the timer 250 receives the initialization signal, the timer 250 may initialize the elapsed time and may count the set time from the beginning.

In an embodiment, the electronic device 101 may transmit, to the timer 250, an initialization signal, a first ignore signal for ignoring the initialization signal, and a second ignore signal for ignoring the first ignore signal, based on the video data and/or the graphical UI. The electronic device 101 may control an operation of the screensaver 146-2 using the initialization signal, the first ignore signal, and/or the second ignore signal.

For example, the electronic device 101 may transmit the initialization signal to the timer 250 depending on whether the video object is output on the display module 160 based on the position of the video object.

For example, the electronic device 101 may transmit the first ignore signal and/or the second ignore signal to the timer 250, based on the size and/or the shape of the video object output on the display module 160. For example, when the video object that is playing is output on the partial area of the display module 160, the electronic device 101 may transmit the first ignore signal and the second ignore signal to the timer 250. For example, when the video object that is stopped is output on the partial area of the display module 160, the electronic device 101 may transmit the initialization signal and the first ignore signal to the timer 250.

For example, when the video object is playing in the partial area of the display module 160, the electronic device 101 may transmit the initialization signal, the first ignore signal, and the second ignore signal to the timer 250. The timer 250 may ignore the first ignore signal using the second ignore signal. When the timer 250 receives the initialization signal, the first ignore signal, and the second ignore signal, the timer 250 may initialize the elapsed time in response to the initialization signal.

For example, when the video object that is playing is output on the full area of the display module 160, the electronic device 101 may periodically transmit the initialization signal to the timer 250. When the video object is finished playing, the electronic device 101 may transmit the initialization signal and the first ignore signal to the timer 250. The timer 250 may ignore the initialization signal using the first ignore signal and may count the set time.

Referring to FIG. 11A, the electronic device 101 may initialize the timer 250 by transmitting the initialization signal to the timer 250. The electronic device 101 may periodically transmit the initialization signal to the timer 250 based on the video data. When the timer 250 is periodically initialized, the electronic device 101 may not execute the screensaver 146-2 and the protective screen may not be output on the display module 160.

Referring to FIG. 11B, the electronic device 101 may not transmit the initialization signal to the timer 250 and the timer 250 may not be initialized. When the time set on the timer 250 has elapsed, the electronic device 101 may execute the screensaver 146-2. When the screensaver 146-2 is executed, the protective screen may be output on the display module 160.

For example, when an input is received, the electronic device 101 may transmit the initialization signal to the timer 250. For example, when the video object that is playing is output on the display module 160, the electronic device 101 may transmit the initialization signal to the timer 250. When the video object is playing, the electronic device 101 may transmit the initialization signal to the timer 250 at every set period.

For example, when an input is not received in the set period or the video object is in the stopped state or the video object that is playing is not output on the display module 160, the electronic device 101 may not transmit the initialization signal to the timer 250.

When the electronic device 101 transmits the initialization signal, the first ignore signal, and the second ignore signal to the timer 250, the electronic device 101 may operate substantially the same as described with reference to FIG. 11A.

When the electronic device 101 transmits the initialization signal and the first ignore signal to the timer 250, the electronic device 101 may operate substantially the same as described with reference to FIG. 11B.

In an example embodiment, an electronic device (e.g., the electronic device 101 of FIG. 1) may include: a processor (e.g., the processor 120 of FIG. 1), a display module including a display panel (e.g., the display module 160 of FIG. 1), a memory electrically connected to the processor and configured to store instructions and an application (e.g., the application 146-1 of FIG. 2) executable by the processor, wherein the processor may be configured to, based on the instructions being executed: identify video data on a size, a state, and a position of a video object (e.g., the video object 210 of FIG. 5) executed by the application 146-1, and based on an input not being received in a specified input waiting time, control a screen output on the display module, based on the video data.

The processor may be further configured to: output, on a full area of the display module, the video object in a playback state and output on a partial area of the display module.

The processor may be further configured to: based on the video object being in a stopped state, execute a screensaver (e.g., the screensaver 146-2 of FIG. 2) to output a protective screen on the display module.

The processor may be further configured to: based on the video object in a playback state not being output on the display module, execute a screensaver (e.g., the screensaver 146-2 of FIG. 2) to output a protective screen on the display module.

The processor may be further configured to: identify a graphical UI (e.g., the graphical UI 220 of FIG. 5) output on the display module and control a screen output on the display module, based on at least one of the video data or the graphical UI.

The processor 120 may be further configured to: identify the video data on sizes, states, and positions of a plurality of video objects and output one of the plurality of video objects on a full area of the display module, based on the video data.

The processor may be further configured to: control an operation of a screensaver (e.g., the screensaver 146-2 of FIG. 2) configured to output a protective screen (e.g., the protective screen 240 of FIG. 6) on the display module, based on the video data.

In an example embodiment, a method of controlling the display module may include: identifying video data on a size, a state, and a position of the video object executed by the application, and based on an input not being received in a specified input waiting time, controlling a screen output on the display module, based on the video data.

The controlling of the screen may include: outputting, on a full area of the display module, the video object in a playback state and output on a partial area of the display module.

The controlling of the screen may include: based on the video object being in a stopped state, executing the screensaver to output the protective screen on the display module.

The controlling of the screen may include: based on the video object in a playback state not being output on the display module, executing the screensaver to output the protective screen on the display module.

The method of controlling the display module may further include: identifying a graphical UI output on the display module, wherein the controlling of the screen may include controlling a screen output on the display module, based on at least one of the video object or the graphical UI.

The identifying of the video data may include identifying the video data on sizes, states, and positions of a plurality of video objects, and the controlling of the screen may include outputting one of the plurality of video objects on a full area of the display module, based on the video data.

The method of controlling the display module may further include controlling an operation of the screensaver configured to output a protective screen on the display module, based on the video data.

In an example embodiment, a method of controlling the display module may include: identifying video data on a size, a state, and a position of a video object from an application configured to execute the video object, controlling an operation of a screensaver configured to output a protective screen on a display module, based on the video data, and based on an input not being received in a specified input waiting time, controlling a screen output on the display module, based on at least one of the video data or the operation of the screensaver.

The controlling of the operation of the screensaver may include: counting a specified time that is set using the timer, and based on the timer finishing counting the set time, executing the screensaver.

The counting of the specified time may include, based on the video object in a playback state being output on the display module, transmitting, to the timer, an initialization signal for initializing the timer.

The controlling of the screen may include outputting, on a full area of the display module, the video object output on a partial area of the display module.

The controlling of the operation of the screensaver may include, based on the video object being in a stopped state or the video object not being output on the display module, executing the screensaver, wherein the controlling of the screen may include outputting the protective screen on the display module.

The method of controlling the display module may further include identifying the graphical UI output on the display module, wherein the controlling of the screen may include controlling a screen output on the display module, based on at least one of the video data or the graphical UI.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor including processing circuitry;
   a display module;
   a memory electrically connected to the at least one processor and configured to store instructions executable by the at least one processor,
   wherein the at least one processor is configured, when the instructions are executed, to:
   output a video object in a playback state on a partial area of the display module,
   identify whether the video object is currently output on the display module, and
   based on an input not being received in a specified input waiting time and in response to the video object being in the playback state but not currently output on the display module, perform an operation providing a protective screen on a full area of the display module.

2. The electronic device of claim 1, wherein the at least one processor is configured, when the instructions are executed, to:
   based on the input not being received in the specified input waiting time and in response to the video object being currently output in the playback state on the partial area of the display module, perform an operation for protecting the display module by controlling an area of the display module other than the partial area of the display module.

3. The electronic device of claim 1, wherein at least one the processor is configured, when the instructions are executed, to:
   based on the input not being received in the specified input waiting time and in response to the video object being currently output in a stopped state on the partial area of the display module, perform the operation providing the protective screen on the full area of the display module.

4. The electronic device of claim 1, wherein the at least one processor is configured, when the instructions are executed, to:
   output a graphical user interface (UI) with the video object, and
   identify whether the graphical user interface (UI) and/or the video object is currently output on the display module.

5. The electronic device of claim 1, wherein the at least one processor is configured, when the instructions are executed, to:
   change a position of the video object based on a user input, and
   output the video object on the display module based on the position of the video object changed by the user input.

6. The electronic device of claim 4, wherein the at least one processor is configured, when the instructions are executed, to:
   based on the input not being received in the specified input waiting time and in response to the video object being currently output in the playback state on the partial area of the display module and the graphical UI being currently output on the display module, perform an operation for protecting the display module by decreasing a brightness of an area other than the partial area of the display module and the graphical UI.

7. The electronic device of claim 4, wherein the at least one processor is configured, when the instructions are executed, to:
   based on an input not being received in a specified input waiting time and in response to the video object being in the playback state but not currently output on the display module and the graphical UI being currently output on the display module, perform an operation for protecting the display module by decreasing a brightness of an area of the display module other than the graphical UI.

8. The electronic device of claim 1, wherein the at least one processor is configured, when the instructions are executed, to:
   identify whether the video object is currently output on the display module based on a position of the video object, wherein the position of the video object refers to coordinates of the video object.

9. An electronic device comprising:
at least one processor including processing circuitry;
a display module;
a memory electrically connected to the at least one processor and configured to store instructions executable by the at least one processor,
wherein the at least one processor is configured, when the instructions are executed, to:
execute a web browser,
display, via the web browser, a web page including a video object in a playback state on a partial area of the web page,
perform a scroll operation with respect to the web page including the video object in the playback state according to a user input, wherein a position of the video object displayed on the display module is changed by the scroll operation,
identify whether the video object included in the scrolled web page is in the playback state and currently displayed on the display module, and
in response to a user input not being received in a specified input waiting time, perform an operation providing a protective screen on a full area of the display module based on the video object being in the playback state but not currently displayed on the display module.

10. The electronic device of claim 9, wherein the at least one processor is configured, when the instructions are executed, to: in response to a user input not being received in a specified input waiting time, perform an operation for protecting the display module by controlling an area of the display module other than the video object, based on the video object being currently output in the playback state on the display module.

11. The electronic device of claim 9, wherein the at least one processor is configured, when the instructions are executed, to:
in response to a user input not being received in a specified input waiting time and the video object is identified in a stopped state and currently displayed on the display module, perform an operation for protecting the display module by controlling a full area of the display module.

12. The electronic device of claim 9, wherein the at least one processor is configured, when the instructions are executed, to:
identify whether the video object included in the scrolled web page is currently output on the display module based on a position of the video object in the scrolled web page, wherein the position of the video object refers to coordinates of the video object.

13. The electronic device of claim 9, wherein the at least one processor is configured, when the instructions are executed, to:
output a graphical user interface (UI) in the web page with the video object,
identify whether the graphical user interface (UI) and/or the video object included in the scrolled web page is currently output on the display module.

14. The electronic device of claim 13, wherein the at least one processor is configured, when the instructions are executed, to:
in response to the user input not being received in a specified input waiting time, perform an operation providing a protective screen by decreasing a brightness of an area of the display module other than the graphical user interface and/or the video object.

15. A method of operating an electronic device, the method comprising:
outputting a video object in a playback state on a partial area of the display module;
identifying whether the video object is currently output on the display module; and
based on an input not being received in a specified input waiting time and the video object being in the playback state but not currently output on the display module, performing an operation providing a protective screen on a full area of the display module.

16. A method of operating an electronic device, the method comprising:
displaying, via the web browser, a web page including a video object in a playback state on a partial area of the web page;
performing a scroll operation with respect to the web page including the video object in the playback state according to a user input, wherein a position of the video object displayed on the display module is changed by the scroll operation;
identifying whether the video object included in the scrolled web page is in the playback state and currently displayed on the display module; and
based on a user input not being received in a specified input waiting time, performing an operation providing a protective screen on a full area of the display module based on the video object being in the playback state but not currently displayed on the display module.

* * * * *